United States Patent
Hirth et al.

(10) Patent No.: US 12,286,918 B2
(45) Date of Patent: Apr. 29, 2025

(54) SUPPORT PIN FOR CATALYTIC CONVERTER WITH ELECTRICAL HEATING DISK

(71) Applicant: Vitesco Technologies GmbH, Regensburg (DE)

(72) Inventors: Peter Hirth, Munich (DE); Sven Schepers, Munich (DE); Thomas Härig, Munich (DE)

(73) Assignee: Vitesco Technologies GmbH, Regensburg (DE)

( * ) Notice: Subject to any disclaimer, the term of this patent is extended or adjusted under 35 U.S.C. 154(b) by 351 days.

(21) Appl. No.: 17/781,909

(22) PCT Filed: Nov. 17, 2020

(86) PCT No.: PCT/EP2020/082346
§ 371 (c)(1),
(2) Date: Jun. 2, 2022

(87) PCT Pub. No.: WO2021/110406
PCT Pub. Date: Jun. 10, 2021

(65) Prior Publication Data
US 2023/0015996 A1    Jan. 19, 2023

(30) Foreign Application Priority Data
Dec. 4, 2019 (DE) ..................... 10 2019 218 885.0

(51) Int. Cl.
*F01N 3/20* (2006.01)
*F01N 3/28* (2006.01)

(52) U.S. Cl.
CPC ........... *F01N 3/2026* (2013.01); *F01N 3/281* (2013.01); *F01N 2240/16* (2013.01); *F01N 2330/02* (2013.01); *F01N 2450/22* (2013.01)

(58) Field of Classification Search
CPC ............. F01N 2240/16; F01N 2330/02; F01N 2450/22; F01N 3/2013; F01N 3/2026; F01N 3/281
See application file for complete search history.

(56) References Cited

U.S. PATENT DOCUMENTS

2014/0290229 A1    10/2014    Hirth et al.

FOREIGN PATENT DOCUMENTS

| CN | 102112712 | 6/2011 |
| CN | 103384756 | 11/2013 |

(Continued)

OTHER PUBLICATIONS

English Translation JP H09220481 (Year: 1997).*

(Continued)

*Primary Examiner* — Anthony Ayala Delgado
(74) *Attorney, Agent, or Firm* — COZEN O'CONNOR

(57) ABSTRACT

A catalytic converter for aftertreatment of combustion gases from an internal combustion engine, having at least one catalyst and at least one electrically heatable heating disk. The catalyst and the heating disk are each formed by a honeycomb having a multitude of flow channels through which flow is possible in a main flow direction. The mechanical connection between the catalyst and the heating disk is formed by at least one support pin (having an inner core. The support pin has a thickening in each of the two end regions and, the core is formed by a ceramic material and the thickening is formed by a ceramic-metal mixture.

11 Claims, 2 Drawing Sheets

(56) References Cited

FOREIGN PATENT DOCUMENTS

| | | |
|---|---|---|
| DE | 4434673 | 4/1996 |
| DE | 10055447 | 6/2002 |
| DE | 102008035561 | 2/2010 |
| DE | 102010052650 | 5/2012 |
| DE | 102011120720 | 6/2013 |
| DE | 102018213358 | 2/2020 |
| EP | 0783621 | 7/1997 |
| EP | 3299599 | 3/2018 |
| JP | 09220481 A * | 8/1997 |

OTHER PUBLICATIONS

Office Action dated Aug. 11, 2023 issued in Chinese Patent Application No. 202080083818.8.
Office Action of corresponding German Patent Application No. 10 2019 218 885.0.
Office Action dated Dec. 4, 2023, issued in European Patent Application No. 20808348.5.

* cited by examiner

SUPPORT PIN FOR CATALYTIC CONVERTER WITH ELECTRICAL HEATING DISK

CROSS REFERENCE TO RELATED APPLICATIONS

This is a U.S. national stage of Application No. PCT/EP2020/082346 filed Nov. 17, 2020. Priority is claimed on German Application No. DE 10 2019 218 885.0 filed Dec. 4, 2019 the content of which is incorporated herein by reference.

BACKGROUND OF THE INVENTION

1. Field of the Invention

The disclosure relates to a catalytic converter for aftertreatment of exhaust gases from an internal combustion engine, comprising at least one catalyst and at least one electrically heatable heating disk, wherein the catalyst and the heating disk are each formed by a honeycomb having a multitude of flow channels through which flow is possible in a main flow direction, wherein the mechanical connection between the catalyst and the heating disk is formed by at least one support pin.

2. Description of Related Art

Support pins in current use in the production of electrically heatable catalyst carriers have the function of mechanically connecting the heating disk upstream of the catalyst to the catalyst, but at the same time of electrically separating the two components from one another. For this purpose, it is conventional to use a pin, the core of which consists of a metal wire that has been provided with a ceramic sheath for electrical insulation. In addition, such a pin may have a metallic sleeve at least on one side of its outer circumference. The metallic sleeve serves regularly for connection of the pin to the heating disk, while the metallic core serves for connection to the matrix of the catalyst.

In the pins that are in current use and are known in the prior art, magnesium oxide (MgO) is regularly used as insulator. A particular disadvantage of magnesium oxide as an insulator is that it is not resistant to being washed out. For example, AdBlue used in the exhaust system can result in washout of the magnesium oxide, which reduces the insulating effect and possibly causes a short circuit. In addition, it is disadvantageous that the potential achievable insulation distance is limited in length when the porous material is used.

SUMMARY OF THE INVENTION

It is therefore an object of one aspect of the present invention to provide a support pin for use in a heated catalytic converter which has improved electrical insulating action and is more resistant to washout of the material used for electrical insulation.

One working example of the invention relates to a catalytic converter for aftertreatment of combustion gases from an internal combustion engine, comprising at least one catalyst and at least one electrically heatable heating disk, wherein the catalyst and the heating disk are each formed by a honeycomb having a multitude of flow channels through which flow is possible in a main flow direction, wherein the mechanical connection between the catalyst and the heating disk is formed by at least one support pin, wherein the support pin has an inner core and the support pin has a thickening in each of the two end regions, wherein the core is formed by a ceramic material and the thickening is formed by a ceramic-metal mixture.

One support pin may be sufficient to connect two honeycombs to one another. According to the end use, however, it may be preferable to use a multitude of support pins to achieve reliable spacing and fixing of the honeycombs.

The ceramic core achieves an insulating effect of the support pin, which achieves electrical insulation of the two honeycombs from one another. The ceramic-metal mixture can create a bond to the honeycombs, for example by soldering. It is especially advantageous compared to support pins already known in the art that a ceramic-metal mixture is more resistant to washout that can be caused, for example, by water solutions, for example composed of an aqueous urea solution (trade name AdBlue). Magnesium oxide used in known support pins is particularly prone to such washouts, which can result in irreversible damage to the support pins.

Preferably, the support pins are cohesively bonded in the respective end regions to the honeycombs or to the structures that form the flow channels. For this purpose, the support pins may, for instance, be soldered to the honeycomb. For this purpose, the support pin, especially in its end regions and at the outer circumference there, must have a sufficiently high metallic content to enable a solder bond. It is possible by the application of an adhesion promoter, for example a solder, between the support pin and the contact sites with the honeycomb to create a durable solder bond.

It is particularly advantageous when one or both thickenings at the end of the support pin have a cylindrical shape. A cylindrical shape is advantageous in order to create stable contact of support pins to the honeycombs, especially the flow channels of the honeycombs in which the support pins have been inserted. More preferably, the thickenings each have a length of 5 mm to a maximum of 20 mm. This ensures a sufficient insertion depth into the respective honeycomb in order to be able to establish a sufficiently durable bond.

It is also advantageous when one or both thickenings at the end of the support pin are formed by multiple superposed layers of a ceramic-metal mixture. Multiple different layers are advantageous since it is possible to use different substance mixtures in layers, in order, for example, to create different material properties within the support pin than at the outer circumference of the support pin. Preference is given to achieving high ceramic contents in the interior and higher metal contents at the outer circumference.

A preferred working example is characterized in that the thickenings at the end of the support pin, in axial direction of the support pin, have a distance from one another of at least 1 mm and not more than 10 mm. These size ratios are especially advantageous for honeycombs as used in exhaust gas aftertreatment devices for motor vehicles, in order to create a suitable distance of the two honeycombs from one another. This is especially intended to prevent an electrical short circuit between the spaced-apart honeycombs, for example as a result of a flashover.

It is also preferable when the metal content in the ceramic-metal mixture increases with rising diameter, such that the metal content close to the ceramic core is lower than at the outer circumference of the thickening of the support pin. In this way, it is possible to improve the connection between the material of the thickenings and of the ceramic core on the one hand and between the material of the thickening and the metallic honeycomb on the other hand. Preference is given to forming a metal-metal contact between the honeycomb and the outside of the thickening of the support pin, while a ceramic-ceramic contact is formed to the extent possible between the core and the inside of the thickening. Since the thickenings are each created by a ceramic-metal mixture, pure metal-metal contact or ceramic-ceramic contact is virtually impossible to achieve. However, the proportion of the material preferred at the respective contact site can be distinctly increased compared to the respective other material.

It is additionally advantageous when the ceramic-metal mixture is nickel-based. Such a nickel-based mixture especially has an advantageous coefficient of thermal expansion.

In addition, it is advantageous when the layers that forms the thickening form an adhesion promoter for bonding of the support pin to the respective honeycombs. An adhesion promoter may, for example, be a solder material that can be used for bonding of the support pin to the honeycomb.

It is also appropriate when the adhesion promoter is formed mainly from copper or nickel or alloys thereof. These alloys give advantageous coefficients of thermal expansion.

Furthermore, it is advantageous when the adhesion promoter has a coefficient of thermal expansion, the size of which is between the coefficient of thermal expansion of the honeycombs and the coefficient of thermal expansion of the ceramic material that forms the core. This is advantageous in order, for example, to avoid cracks as a result of thermal stresses.

In addition, it is appropriate when the ceramic core projects at least on one side beyond the thickening at the end in the direction of axial extension of the support pin. This achieves an additional insulation distance which is especially intended to prevent an electrical flashover.

Advantageous developments of aspects of the present invention are described in the dependent claims and in the description of the figures that follows.

BRIEF DESCRIPTION OF THE DRAWINGS

The invention is described in detail hereinafter by working examples with reference to the drawings. The drawings show.

DETAILED DESCRIPTION OF THE PRESENTLY PREFERRED EMBODIMENTS

Figure 1:
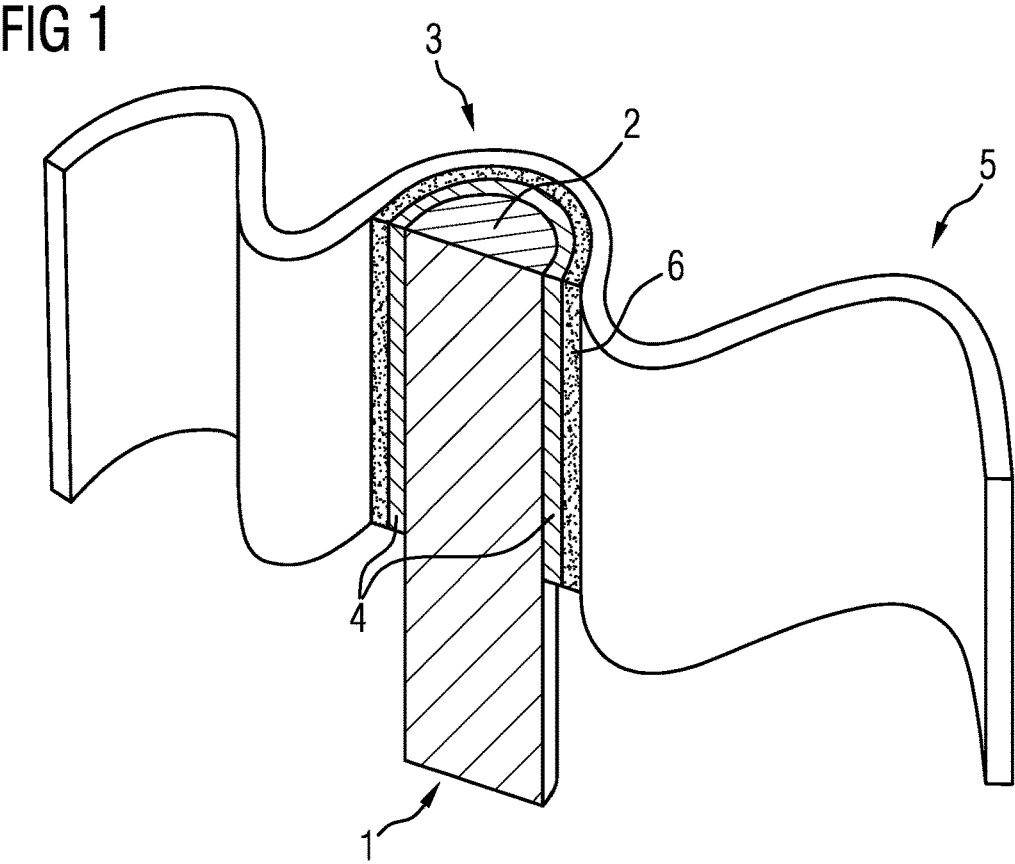
FIG. 1 is a sectional view through a support pin, especially the end region of the support pin.

FIG. 1 shows a section through a support pin 1. This has a ceramic core 2. At its two ends, although only one is shown, the support pin 1 has a thickening 3 formed by a coating 4 of a ceramic-metal mixture.

The support pin 1 is accommodated in a honeycomb 5. Only a portion of one corrugated layer of the honeycomb 5 is shown in FIG. 1. The support pin 1 is inserted here into one of the corrugations at the end. The corrugated layer indicated and the smooth layers that are not shown collectively form the flow channels of the honeycomb 5.

Between the support pin 1 and the honeycomb 5 is disposed an adhesion promoter 6 that serves for bonding between the honeycomb 5 and the thickening 3 of the support pin 1. An adhesion promoter 6 may, for example, be a solder, which is utilized for soldering of the honeycomb 5 to the ceramic-metal mixture 4 of the support pin 1.

The ceramic-metal mixture 4 may have different concentrations of ceramic or metal in the radial direction. For this purpose, the thickening 3 formed by the ceramic-metal mixture 4 may be formed, for example, from multiple layers each having different mixing ratios between the ceramic constituents and the metallic constituents.

Figure 2:
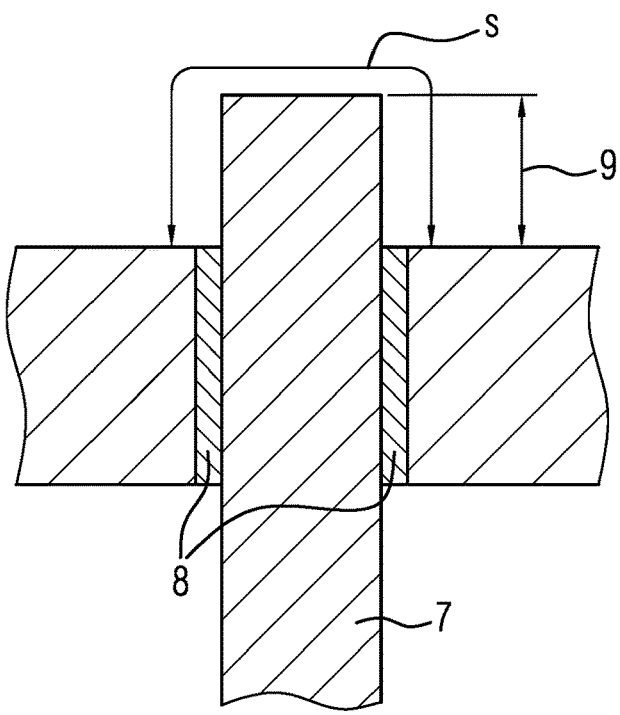
FIG. 2 is a sectional view through a support pin with a ceramic core projecting beyond the thickening at the end.

FIG. 2 shows a further section view through a support pin 7, wherein, by contrast with FIG. 1, the support pin 7 has a ceramic core 8 that projects in axial direction beyond the end region of the support pin 7 defined by the thickening 8. The projecting section 9 of the ceramic core does not have any further ceramic-metal mixture coating. This is especially advantageous when the insulation distance created by the support pin is to be longer. By virtue of the purely ceramic section 9, the length identified by the letter s is obtained as an additional insulation zone. The section 9 preferably projects beyond the point of connection between the support pin and the honeycomb into the honeycomb.

Such a construction is especially advantageous when the support pin is utilized for electrical insulation of two metals in one of the end regions that bear different electrical charges, in order to prevent a short circuit between these.

Figure 3:
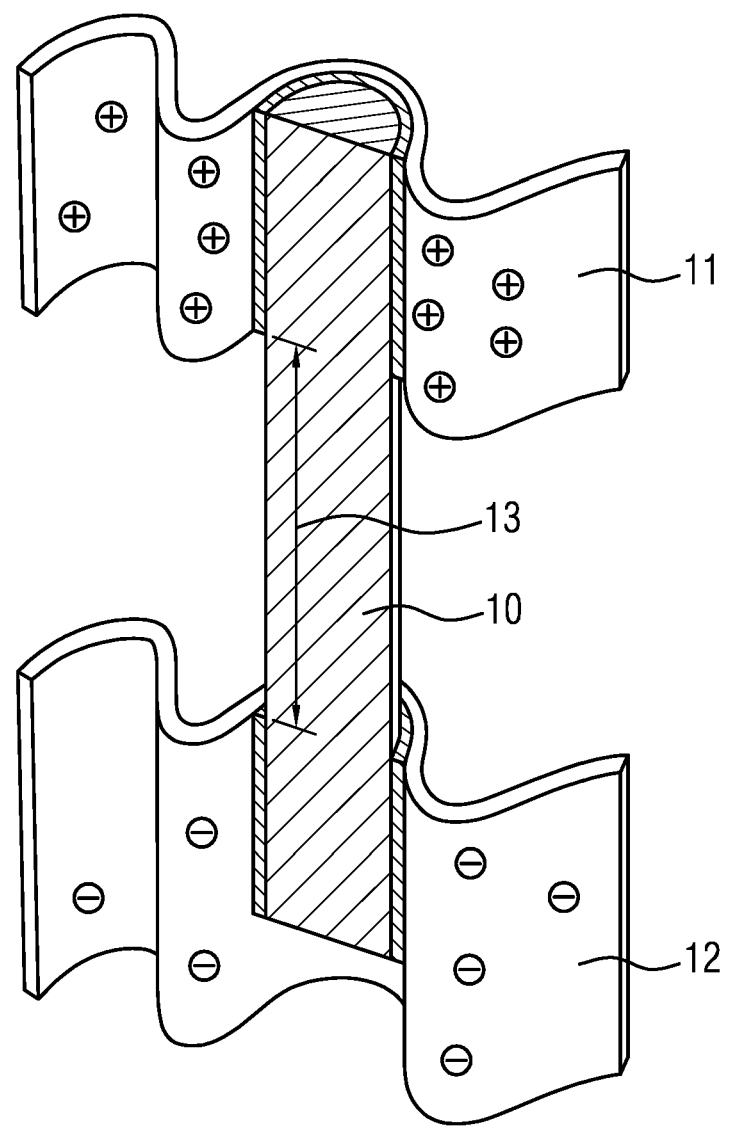
FIG. 3 is a sectional view through a support pin, with both end regions accommodated in a metallic honeycomb.

FIG. 3 shows a further section through a support pin 10, wherein each end of support pin 10 in FIG. 3 is inserted into and bonded to a honeycomb indicated by a corrugated layer 11, 12. The support pin 10 likewise has thickenings at the end by a ceramic-metal mixture bonded to the honeycomb by an adhesion promoter and a suitable processing operation.

In FIG. 3, it can be seen how the two honeycombs connected to one another by the support pin 10 are spaced apart from one another by the distance 13. The distance 13 is defined essentially by the length of the support pin 10 and the length of the thickenings at the ends. The distance 13 is preferably large enough to prevent an electrical short circuit between the two honeycombs, and at the same time small enough for best possible assurance of the desired effects, for example the heating of a honeycomb by an electrically heated honeycomb.

The working examples of FIGS. 1 to 3, in particular, have no limiting character and serve to illustrate the concept of the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A catalytic converter for aftertreatment of combustion gases from an internal combustion engine, comprising:
   at least one catalyst;

at least one heating disk that is electrically heatable, wherein the at least one catalyst and the at least one heating disk are each formed by a honeycomb having a plurality of flow channels through which flow is possible in a main flow direction, and at least one support pin configured to form a mechanical connection between the at least one catalyst and the at least one heating disk, comprising:

an inner core formed by a ceramic material; and a thickening in each of its two end regions formed by a ceramic-metal mixture.

2. The catalytic converter as claimed in claim 1, wherein one or both thickenings at each end of the support pin have a cylindrical shape.

3. The catalytic converter as claimed claim 1, wherein one or both thickenings at each end of the support pin are formed by multiple superposed layers of a ceramic-metal mixture.

4. The catalytic converter as claimed in claim 1, wherein the thickenings at each end of the support pin, in axial direction of the support pin, have a distance from one another of at least 1 mm and not more than 10 mm.

5. A catalytic converter for aftertreatment of combustion gases from an internal combustion engine, comprising:

at least one catalyst;

at least one heating disk that is electrically heatable, wherein the at least one catalyst and the at least one heating disk are each formed by a honeycomb having a plurality of flow channels through which flow is possible in a main flow direction, and at least one support pin (1, 7, 10) configured to form a mechanical connection between the at least one catalyst and the at least one heating disk, comprising:

an inner core formed by a ceramic material; and a thickening in each of its two end regions formed by a ceramic-metal mixture, wherein a metal content in the ceramic-metal mixture increases with rising diameter, such that the metal content close to the inner core is lower than at an outer circumference of the thickening of the support pin.

6. The catalytic converter as claimed in claim 1, wherein the ceramic-metal mixture is nickel-based.

7. The catalytic converter as claimed in claim 3, wherein the layers that form the thickening form an adhesion promoter for bonding of the support pin to the respective honeycombs.

8. The catalytic converter as claimed in claim 7, wherein the adhesion promoter is one or more of copper, nickel, or alloys thereof.

9. The catalytic converter as claimed in claim 7, wherein the adhesion promoter has a coefficient of thermal expansion that is between a coefficient of thermal expansion of the honeycombs and a coefficient of thermal expansion of the ceramic material that forms the inner core.

10. The catalytic converter as claimed in claim 7, wherein the inner core projects at least on one side beyond the thickening at the end in a direction of axial extension of the support pin.

11. The catalytic converter as claimed in claim 1, wherein the at least one catalyst and the at least one heating disk are spaced apart from one another by a distance and the thickening is not present in a region of the distance.

* * * * *